United States Patent
Sigrist et al.

(10) Patent No.: US 11,155,045 B2
(45) Date of Patent: Oct. 26, 2021

(54) DRIVE SYSTEM FOR AUTOMATIC WELDING MACHINE

(71) Applicant: Leister Technologies AG, Kägiswil (CH)

(72) Inventors: Flavio Sigrist, Sachseln (CH); Lukas Gisler, Alpnach Dorf (CH)

(73) Assignee: Leister Technologies AG, Kägiswil (CH)

( * ) Notice: Subject to any disclaimer, the term of this patent is extended or adjusted under 35 U.S.C. 154(b) by 115 days.

(21) Appl. No.: 15/959,184

(22) Filed: Apr. 21, 2018

(65) Prior Publication Data

US 2018/0319095 A1 Nov. 8, 2018

(30) Foreign Application Priority Data

May 5, 2017 (EP) .................................. 17 169 643

(51) Int. Cl.
*B29C 65/00* (2006.01)
*B29C 65/02* (2006.01)
(Continued)

(52) U.S. Cl.
CPC ............ *B29C 66/822* (2013.01); *B29C 65/02* (2013.01); *B29C 65/229* (2013.01);
(Continued)

(58) Field of Classification Search
CPC . B29C 66/822; B29C 66/43; B29C 66/73921; B29C 65/02; B29C 66/86523;
(Continued)

(56) References Cited

U.S. PATENT DOCUMENTS 4,185,514 A * 1/1980 Edwards ................... F16H 1/16
74/421 A
4,561,624 A * 12/1985 Freeman ................... F16H 7/14
248/639
(Continued)

FOREIGN PATENT DOCUMENTS

CA 1096286 A 2/1981
DE 77 00 687 U1 3/1981
(Continued)

OTHER PUBLICATIONS

Glueck, "Advantages and Disadvantages of Planetary Gearmotors", Bodine Electric Gearmotor Blog, May 7, 2013 (Year: 2013).*
(Continued)

*Primary Examiner* — Michael N Orlando
*Assistant Examiner* — Christopher W Raimund
(74) *Attorney, Agent, or Firm* — Renner, Otto, Boisselle & Sklar, LLP

(57) ABSTRACT

A drive system for driving an automatic welding machine for joining the edges of sealing sheets, comprising pressing/advancing rollers located vertically opposite one another and driven by a shared drive motor, downstream of which a transmission gear mechanism is connected, and an upper pressing/advancing roller is disposed rotatably about a roller rotational axis on a tensioning arm of the automatic welding machine, which is pivotable about a tensioning arm axis, and a lower pressing/advancing roller is disposed rotatably about a roller rotational axis on a frame of the automatic welding machine, which is supported by at least two drive rollers, wherein the drive motor and the transmission gear mechanism are rigidly attached to the frame, and the drive motor comprises a motor armature including a protruding rotational shaft, and the transmission gear mechanism comprises a rotatable protruding input shaft and output shaft.

16 Claims, 4 Drawing Sheets

(51) Int. Cl.
  *B29C 65/22* (2006.01)
  *B29C 65/74* (2006.01)
  *B29C 65/78* (2006.01)
  *B29C 65/20* (2006.01)
(52) U.S. Cl.
  CPC ...... *B29C 65/7439* (2013.01); *B29C 65/7805* (2013.01); *B29C 66/1122* (2013.01); *B29C 66/43* (2013.01); *B29C 66/73921* (2013.01); *B29C 66/8362* (2013.01); *B29C 66/86523* (2013.01); *B29C 65/20* (2013.01); *B29C 66/81417* (2013.01); *B29C 66/8222* (2013.01)
(58) Field of Classification Search
  CPC .............. B29C 66/1122; B29C 65/229; B29C 65/7439; B29C 65/7805; B29C 66/8362; B29C 66/8222; B29C 65/20; B29C 66/81417; B29C 65/7858; B29L 2007/00
  See application file for complete search history.

(56) References Cited

U.S. PATENT DOCUMENTS

| | | | |
|---|---|---|---|
| 4,744,855 A * | 5/1988 | Ellenberger | B29C 66/8362 156/499 |
| 4,923,558 A | 5/1990 | Ellenberger | |
| 6,050,317 A * | 4/2000 | Weissfloch | B29C 66/1122 156/499 |
| 6,186,210 B1 * | 2/2001 | Gehde | B29C 66/81433 156/499 |
| 2008/0078603 A1 * | 4/2008 | Taji | B60K 1/00 180/312 |
| 2014/0227044 A1 * | 8/2014 | Youngblood, Jr. | G01M 3/40 405/302.7 |

FOREIGN PATENT DOCUMENTS

| | | |
|---|---|---|
| DE | 85 29 090 U1 | 12/1985 |
| DE | 88 05 783 U1 | 6/1988 |

OTHER PUBLICATIONS

Amatrol Inc., Mechanical Drives 1, Spur Gear Drives, 1st edition, LAP 6, Rev. C, https://4.files.edl.io/6063/08/05/19/203647-cb3177f2-3436-49ba-929d-44ea63da88d1.pdf (2014) (Year: 2014).*
European Search Report for Corresponding App. No. 17 169 643.8, dated Oct. 17, 2017.

* cited by examiner

DRIVE SYSTEM FOR AUTOMATIC WELDING MACHINE

CROSS REFERENCE TO RELATED APPLICATIONS

This application claims priority under 35 USC § 119 to European Patent Application No. 17 169 643.8, filed May 5, 2017, the entire disclosure of which is incorporated herein by reference.

TECHNICAL FIELD

The invention relates to a drive system for driving an automatic welding machine designed to join the edges of sealing sheets, wherein the automatic welding machine comprises at least two pressing/advancing rollers located vertically opposite one another, an electric drive motor for at least one of the pressing/advancing rollers, and a transmission gear mechanism connected downstream of the drive motor, and an upper pressing/advancing roller is disposed rotatably about an upper roller rotational axis on a tensioning arm of the automatic welding machine and a lower pressing/advancing roller is disposed rotatably about a lower roller rotational axis on a frame of the automatic welding machine, wherein the tensioning arm is mounted pivotably about a tensioning arm axis on the frame of the automatic welding machine, and the frame is supported by at least two drive rollers, the drive motor and the transmission gear mechanism are rigidly attached to the frame, wherein the drive motor comprises a motor armature rotating about a protruding rotational shaft, and the transmission gear mechanism comprises a rotatable protruding input shaft and a rotatable protruding output shaft, and wherein the tensioning arm axis, the roller rotational axis, the rotational shaft, the input shaft and the output shaft are disposed parallel to one another.

The invention furthermore relates to an automatic welding machine for joining the edges of sealing sheets made of thermoplastic materials, comprising at least one advancing roller, an electric drive motor for the advancing roller, and a transmission gear mechanism connected downstream of the drive motor, wherein the advancing roller is disposed rotatably about a roller rotational axis on a tensioning arm of the automatic welding machine, and the tensioning arm is mounted pivotably about a tensioning arm axis on a frame of the automatic welding machine supported by drive rollers.

BACKGROUND ART

Drive systems for driving an automatic welding machine of the type in question are known from the prior art in a variety of embodiments. The drive motor and the transmission gear mechanism are usually rigidly attached to the frame, wherein the drive motor comprises a motor armature rotating about a rotational shaft, and the transmission gear mechanism comprises a rotatable protruding input shaft and a rotatable protruding output shaft. In general, the tensioning arm axis of the tensioning arm, the roller rotational axes of the upper and the lower pressing/advancing rollers, the rotational shaft of the motor armature, and the input shaft and the output shaft of the transmission gear mechanism extend parallel to one another.

A first embodiment of such an automatic welding machine, in which the drive motor and the transmission gear mechanism are disposed parallel to one another and preferably extend at a small distance next to one another, is known. The rotational shaft of the motor armature is thus disposed laterally next to the input shaft and the output shaft of the transmission gear mechanism. The ends of the protruding rotational shaft and of the protruding input shaft support pulleys, for example, by way of which a V-belt connects the rotational shaft to the input shaft in a force-fit manner.

Moreover, a second embodiment of such an automatic welding machine is known, in which the drive motor and the transmission gear mechanism are disposed coaxially in series and preferably directly adjoin one another. The rotational shaft of the motor armature and the input shaft and the output shaft of the transmission gear mechanism are thus disposed aligned with one another. The ends of the protruding rotational shaft and of the protruding input shaft pointing facing one another are connected to one another in a force-fit manner by suitable coupling means.

In the two above-described embodiments of an automatic welding machine, first the rotational speed of the electric drive motor is reduced via the transmission gear mechanism, and thereafter the rotational movement of the output shaft is transmitted by way of link chains, via provided spur gears, to the rotatably mounted tensioning arm axis and to a connecting rotational shaft that is disposed beneath the tensioning arm axis and rotatably accommodated in the frame, from where the rotational movement is forwarded to the roller rotational axis of the lower pressing/advancing roller. Both embodiments have in common that the output shaft of the transmission gear mechanism in the customary usage position of the respective automatic welding machine is disposed vertically above the tensioning arm axis. This has been found to be unfavorable when the rotational movement of the output shaft has to be transmitted at low speeds and high torque to the tensioning arm axis and the connecting rotational shaft.

SUMMARY

Proceeding from the above-described prior art, it is the object of the invention to propose an option for transmitting the rotational movement of the output shaft more effectively to the tensioning arm axis and the connecting rotational shaft even at low speeds and high torque, and thereby overcome the above-described disadvantages of the prior art.

This object is achieved according to the invention by a drive system for driving an automatic welding machine having the features described herein.

The core idea of the invention is to develop a novel concept in which the gear reduction for the motor speed of the drive motor by way of the transmission gear mechanism takes place closer to the tensioning arm axis and the connecting rotational shaft of the frame.

In the drive system according to the invention for driving an automatic welding machine, the rotational shaft of the motor armature and the output shaft of the transmission gear mechanism extend next to, and laterally offset from, one another at a distance, wherein at least the output shaft is disposed at the level of the tensioning arm axis of the tensioning arm. In the customary usage position of the automatic welding machine, the output shaft is thus disposed at the same horizontal level as the tensioning arm axis. Preferably, the rotational shaft of the motor armature and the output shaft of the transmission gear mechanism extend horizontally next to one another. The rotational shaft of the motor armature and the input shaft and the output shaft of the transmission gear mechanism are thus preferably located at the same level as the tensioning arm axis in relation to a plane spanned by the two drive rollers for the frame. In other words, according to the invention, the rotational shaft of the motor armature and the output shaft of the transmission gear mechanism are not coaxially disposed. In the drive system according to the invention, this additionally causes at least the roller rotational axis of the lower pressing/advancing roller to be disposed outside the plane spanned by the rotational shaft of the motor armature and at least the input shaft of the transmission gear mechanism. This preferably applies not only to the input shaft, but also to the output shaft of the transmission gear mechanism. This results in a compact design for the automatic welding machine in that the output shaft of the transmission gear mechanism is located particularly close to or directly in the tensioning arm axis.

In a preferred embodiment of the drive system according to the invention, the rotational shaft of the motor armature and at least the output shaft of the transmission gear mechanism extend in a plane extending parallel to the plane spanned by the at least two drive rollers.

In a favored embodiment of the invention, the output shaft of the transmission gear mechanism is moreover disposed coaxially with respect to the tensioning arm axis. This allows a particularly simple rotationally fixed connection between the output shaft and the tensioning arm axis of the tensioning arm. The output shaft of the transmission gear mechanism is advantageously disposed aligned with the tensioning arm axis.

In one embodiment of the drive system according to the invention, the output shaft of the transmission gear mechanism advantageously has a shaft extension, which forms the tensioning arm axis. The shaft extension is integrally formed on the output shaft and thus forms an integral part of the output shaft. A separate tensioning arm axis can thus be dispensed with, which favorably impacts assembly times.

In a preferred variant of the invention, the motor armature comprises a rotational shaft, which protrudes over a motor housing of the drive motor on the output side, wherein a protruding end of the rotational shaft of the drive motor and an end of the input shaft of the transmission gear mechanism protruding over a gear mechanism housing each comprise a pulley, the pulleys being disposed next to one another in a plane and connected to a drive belt.

In a further advantageous variant of the drive system according to the invention, the lower pressing/advancing roller and/or the upper pressing/advancing roller are connected via a drive intermediate gear mechanism, for example via the connecting rotational shaft, to the output shaft of the transmission gear mechanism or the shaft extension of the output shaft of the transmission gear mechanism.

The automatic welding machine according to the invention for joining the edges of sealing sheets made of thermoplastic materials, comprising at least one pressing/advancing roller, an electric drive motor for the pressing/advancing roller, and a transmission gear mechanism connected downstream of the drive motor, wherein the pressing/advancing roller is disposed rotatably about a roller rotational axis on a tensioning arm of the automatic welding machine, and the tensioning arm is mounted pivotably about a tensioning arm axis on a frame of the automatic welding machine supported by drive rollers, comprises a drive system as described above. In an advantageous embodiment, the automatic welding machine according to the invention advantageously comprises at least two pressing/advancing rollers located vertically opposite one another, wherein at least an upper pressing/advancing roller is disposed rotatably about an upper roller rotational axis on a tensioning arm of the automatic welding machine, and a lower pressing/advancing roller is disposed rotatably about a lower roller rotational axis on a frame of the automatic welding machine.

The advantages of the invention are that a double-rowed chain, which previously was subjected to high loads, in the gear mechanism tower, is dispensed with, several wear components, such as the chain and sprockets, having short life cycles and high procurement costs are replaced with wear components having long service lives and low procurement costs, a lower height is made possible for the automatic welding machine, and optimal utilization of the installation space is made possible. A particularly compact design can, in particular, be achieved by mounting the output shaft of the transmission gear mechanism directly in the axis of the tensioning arm.

BRIEF DESCRIPTION OF THE DRAWINGS

The invention will be described hereafter in more detail based on an exemplary embodiment, which is illustrated in the drawings. Additional features of the invention will be apparent from the following description of the exemplary embodiments of the invention in conjunction with the claims and the accompanying drawings. In the drawings:

DETAILED DESCRIPTION

Figure 1:
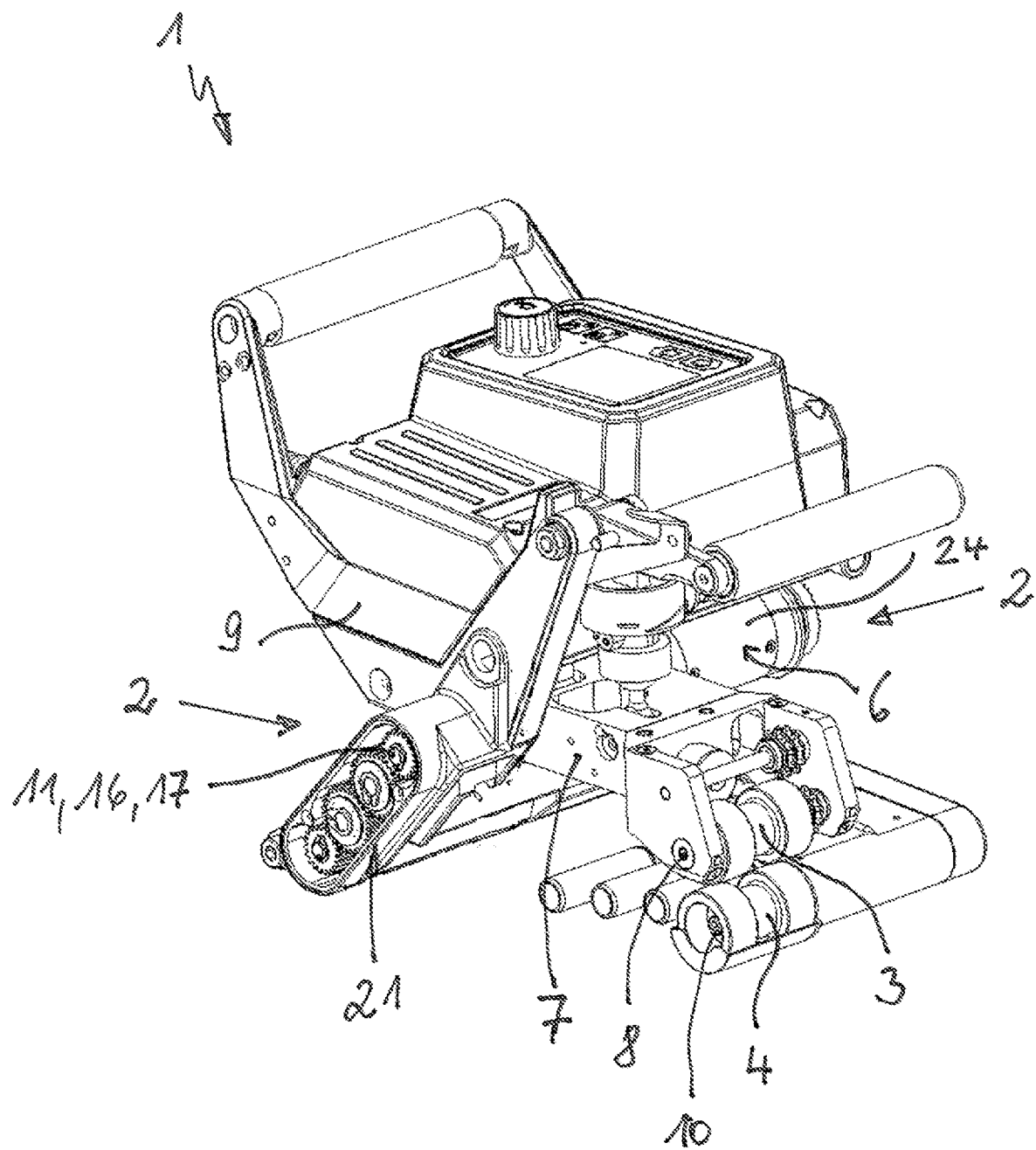
FIG. 1 shows an automatic welding machine comprising a drive system according to the invention in a perspective illustration, with a view at the left and rear side of the automatic welding machine during welding in the direction of travel.

FIGS. 1 to 4 show schematic illustrations of an automatic welding machine 1 according to the invention, comprising a drive system 2 according to the invention for driving the automatic welding machine 1, which is designed to join the edges of sealing sheets, which are not shown in the figures. The automatic welding machine 1 comprises two pressing/advancing rollers 3, 4 located vertically opposite one another, an electric drive motor 5 for at least one of the pressing/advancing rollers 3, 4, and a transmission gear mechanism 6 connected downstream of the drive motor 5, wherein an upper pressing/advancing roller 3 is disposed rotatably about an upper roller rotational axis 8 on a tensioning arm 7 of the automatic welding machine 1, and a lower pressing/advancing roller 4 is disposed rotatably about a lower roller rotational axis 10 on a frame 9 of the automatic welding machine 1.

The tensioning arm 7 is mounted pivotably about a tensioning arm axis 11 on the frame 9 of the automatic welding machine 1. The frame 9 itself is supported by two elongated drive rollers 12, 13 (FIG. 4), wherein the drive roller 12 is disposed at the front in the direction of travel of the automatic welding machine 1, and the drive roller 13 is disposed at the rear in the direction of travel of the automatic welding machine 1. The drive motor 5 and the transmission gear mechanism 6 are rigidly attached to the frame 9, wherein the drive motor 5 comprises a motor armature, which is not visible in the figures, rotating about a protruding rotational shaft 14, and the transmission gear mechanism 6 comprises a rotatable protruding input shaft 15 and a rotatable protruding output shaft 16. The rotational shaft 14 and the input shaft 15 are apparent in FIG. 2, and the output shaft 16 is apparent in FIGS. 1, 3 and 4.

The tensioning arm axis 11, the roller rotational axes 8 and 10, the rotational shaft 14, the input shaft 15 and the output shaft 16 are disposed parallel to one another, wherein the rotational shaft 14 of the motor armature of the drive motor 5 and the output shaft 16 of the transmission gear mechanism 6 extend next to, and laterally offset from, one another. The output shaft 15 of the transmission gear mechanism 6 extends vertically to the level of the tensioning arm axis 11 of the tensioning arm 7 in the customary usage position of the automatic welding machine 1, which is shown in FIGS. 1 to 4. In this usage position, the rotational shaft 14 of the drive motor 5 and the output shaft 16 the transmission gear mechanism 6 extend horizontally next to one another. In the illustrated exemplary embodiment, the rotational shaft 14 of the drive motor 5 and the input shaft 15 and the output shaft 16 of the transmission gear mechanism 6 are located at the same level as the tensioning arm axis 11 in relation to a plane spanned by one of the two drive rollers 12, 13 of the frame 9. The rotational shaft 14 and the output shaft 16 of the transmission gear mechanism 6 are thus not coaxially disposed. In the drive system 2 according to the invention, the lower roller rotational axis 10 of the lower pressing/advancing roller 4 is thus disposed outside the plane spanned by the rotational shaft 14 of the motor armature of the drive motor 5 and the input shaft 15 of the transmission gear mechanism 6. In the illustrated exemplary embodiment, in the drive system 2, additionally, the upper roller rotational axis 8 of the upper pressing/advancing roller 3 is disposed outside the plane spanned by the rotational shaft 14 of the motor armature of the drive motor 5 and the input shaft 15 of the transmission gear mechanism 6. The plane spanned by the rotational shaft 14 of the drive motor 5 and the input shaft 15 of the transmission gear mechanism 6 extends above the roller rotational axes 8, 10 of the pressing/advancing rollers 3, 4, and also above the respective upper or lower pressing/advancing roller 3 or 4.

In the illustrated drive system 2, the rotational shaft 14 of the motor armature of the drive motor 5 and at least the output shaft 16 of the transmission gear mechanism 6 extend in a plane that is parallel to the plane spanned by the at least two drive rollers 12, 13. In the illustrated preferred embodiment of the invention, additionally, the output shaft 16 of the transmission gear mechanism 6 is disposed coaxially with respect to the tensioning arm axis 11 of the tensioning arm 7, and advantageously extends aligned with the tensioning arm axis 11. The output shaft 16 and the tensioning arm axis 11 of the tensioning arm 7 are directly coupled to one another in a rotationally fixed manner. For this purpose, the output shaft 16 of the transmission gear mechanism 6 includes a shaft extension 16, which is visible in FIG. 2 and which is integrally formed on the output shaft 16 and forms the tensioning arm axis 11.

Figure 2:
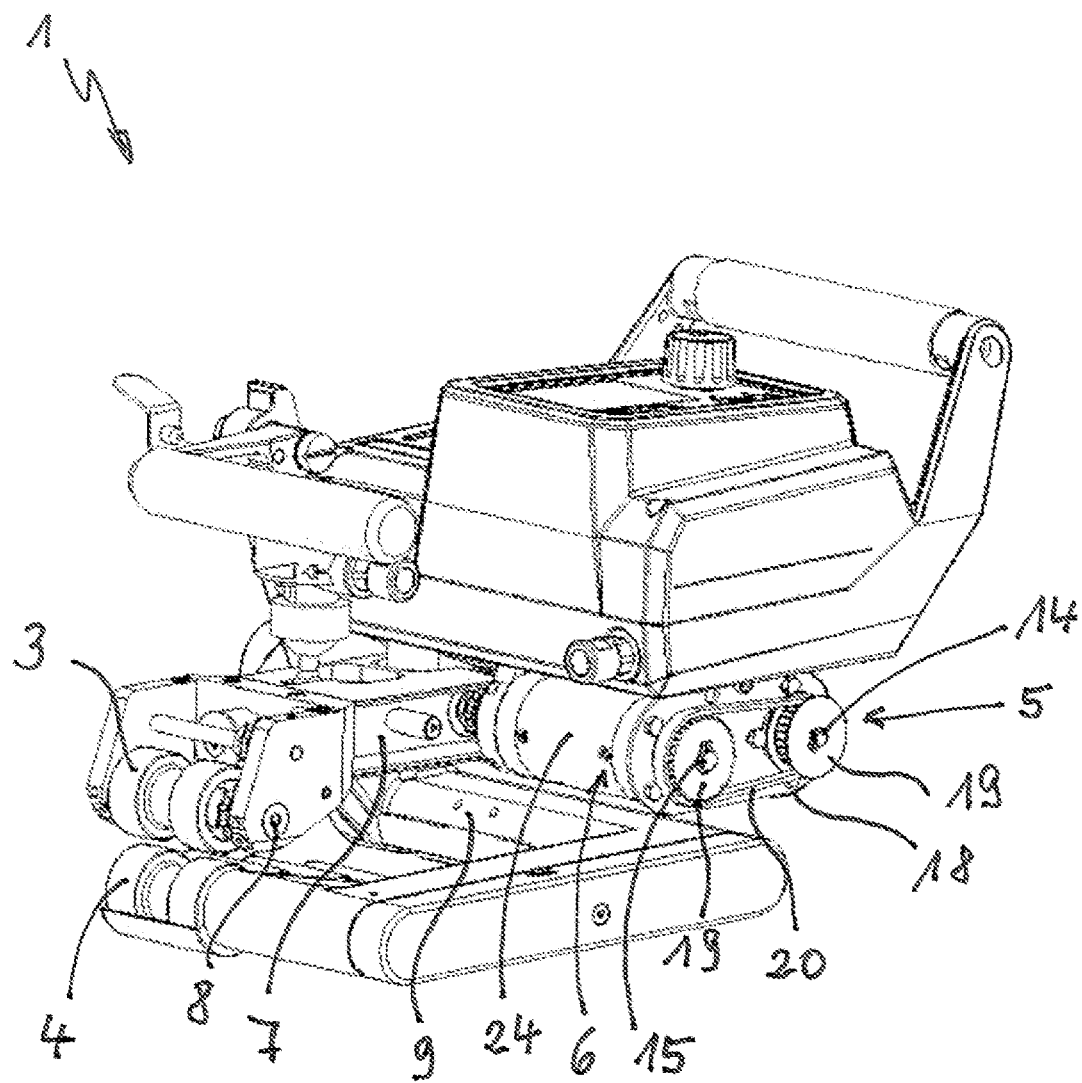
FIG. 2 shows the automatic welding machine from FIG. 1 in a perspective illustration, with a view at the right and rear side of the automatic welding machine during welding in the direction of travel.

As is apparent from FIG. 2, the motor armature of the drive motor 5 comprises a rotational shaft 14, which protrudes over a motor housing 18 of the drive motor 5 on the output side, wherein a protruding end of the rotational shaft 14 of the drive motor 5 and an end of the input shaft 15 of the transmission gear mechanism 6 protruding over a gear mechanism housing 24 each comprise a pulley 19, the pulleys being disposed next to one another in a plane and connected to a drive belt 20 in a force-fit manner.

Figure 3:
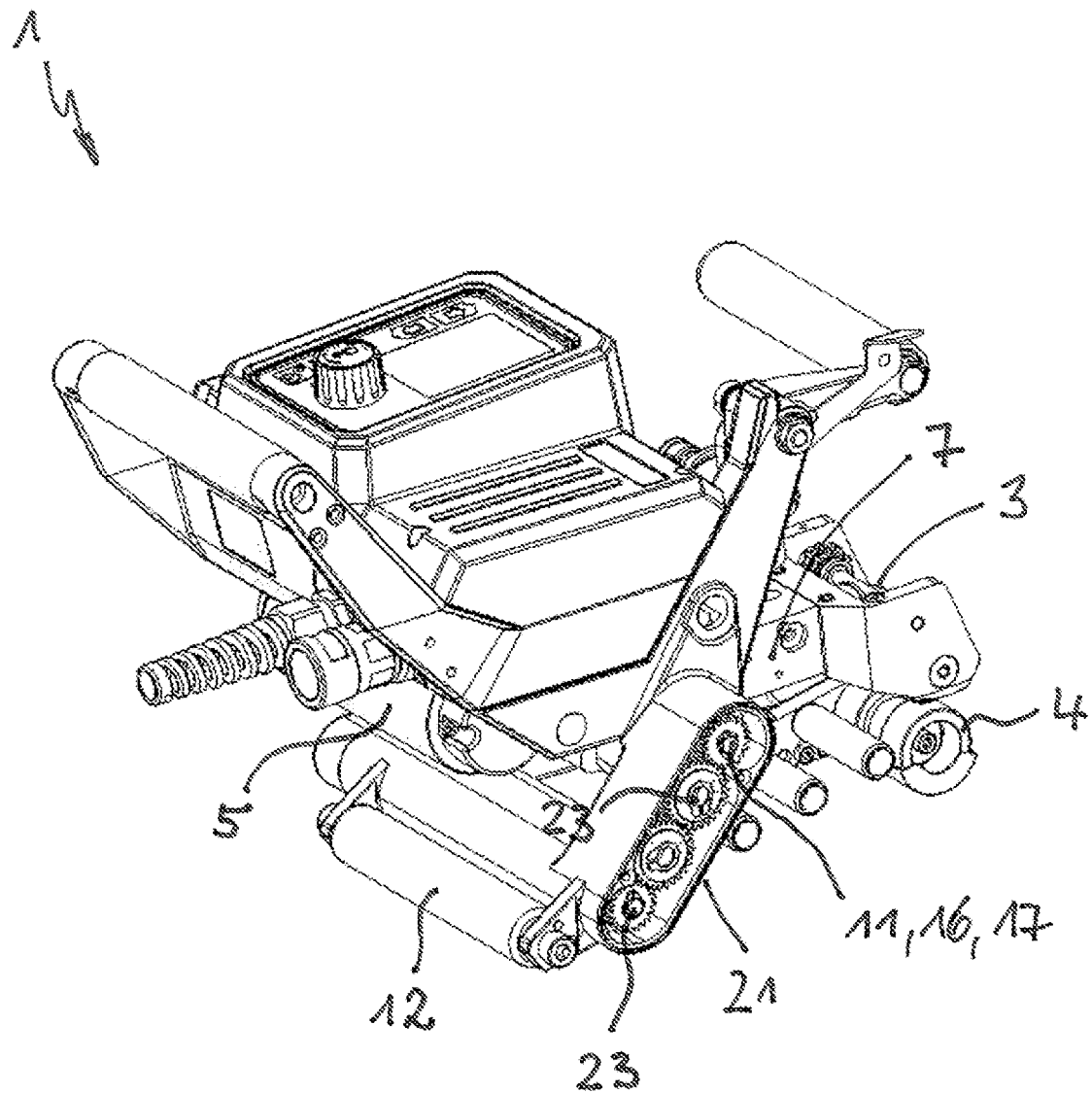
FIG. 3 shows the automatic welding machine from FIG. 1 in a perspective illustration, with a view at the left and front side of the automatic welding machine during welding in the direction of travel.
Figure 4:
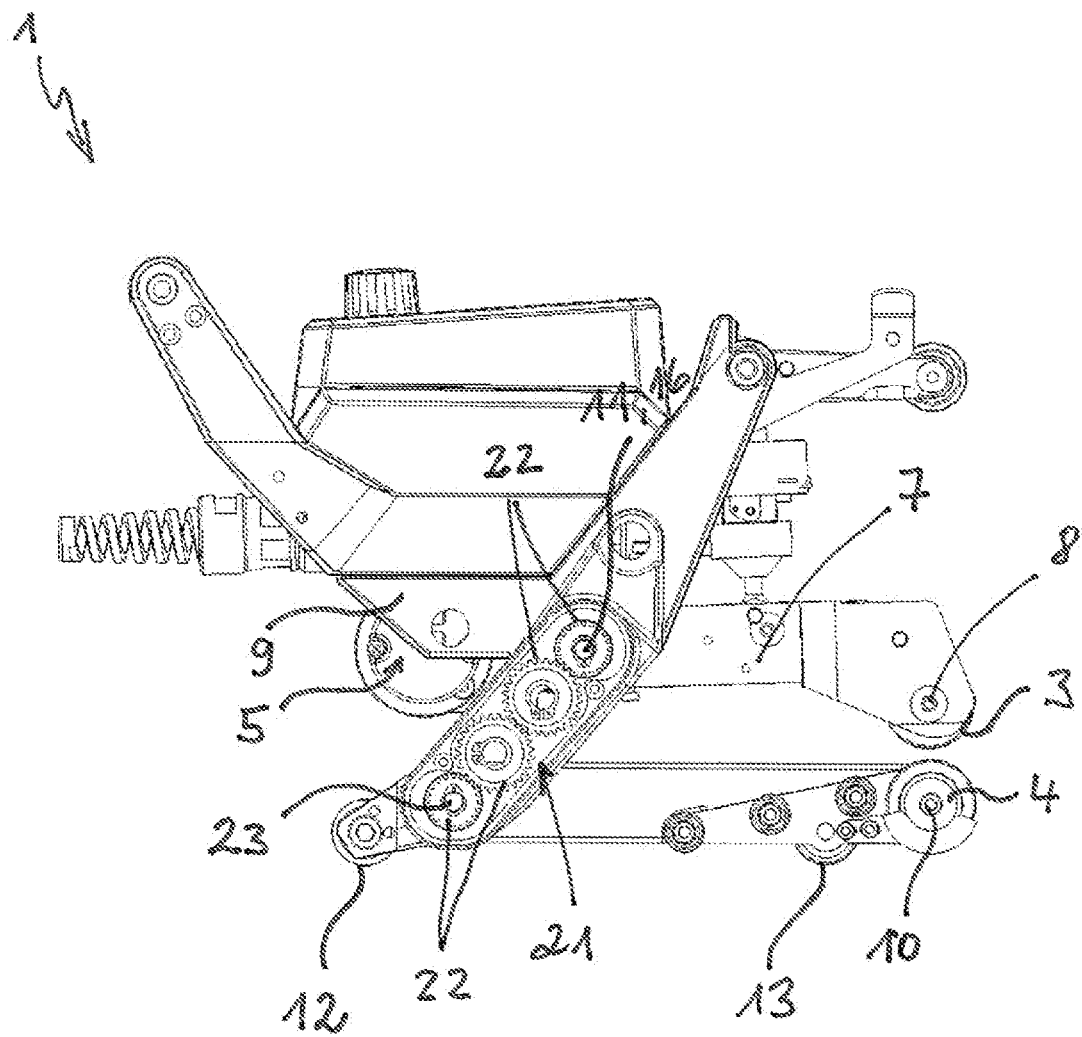
FIG. 4 shows the automatic welding machine from FIG. 1 in a side view, with a view at the left side of the automatic welding machine during welding in the direction of travel.

As FIGS. 1, 3 and 4 illustrate, in the shown drive system 2, the lower pressing/advancing roller 4 and the upper pressing/advancing roller 3 are connected via a drive intermediate gear mechanism 21, which on the input side is connected to the tensioning arm axis 11 or to the extended output shaft 16. The drive intermediate gear mechanism 21 is a gear wheel mechanism, wherein two gear wheels 22 of the intermediate gear mechanism 21 are each supported by a connecting rotational shaft 23, from where the rotational movement of the output shaft 16 of the transmission gear mechanism 6 is forwarded to the upper roller rotational axis 8 of the upper pressing/advancing roller 3, or to the lower roller rotational axis 10 of the lower pressing/advancing roller 4, by transmission means not visible in the figures.

The invention claimed is:

1. A drive system for driving an automatic welding machine designed to join the edges of sealing sheets, the automatic welding machine comprising at least two pressing/advancing rollers located vertically opposite one another, an electric drive motor for at least one of the pressing/advancing rollers and a transmission gear mechanism connected downstream of the drive motor, an upper pressing/advancing roller being disposed rotatably about a driven upper roller rotational axis on a tensioning arm of the automatic welding machine and a lower pressing/advancing roller being disposed rotatably about a lower roller rotational axis on a frame of the automatic welding machine, the tensioning arm being mounted pivotably about a tensioning arm axis on the frame of the automatic welding machine, and the frame being supported by at least two drive rollers, the drive motor and the transmission gear mechanism being rigidly attached to the frame, the transmission gear mechanism being arranged outside and laterally offset to the tensioning arm, the drive motor comprising a motor armature rotating about a protruding rotational shaft, and the transmission gear mechanism comprising a rotatable protruding input shaft and a rotatable protruding output shaft, and the tensioning arm axis, the roller rotational axis, the rotational shaft, the input shaft and the output shaft being disposed parallel to one another, wherein the rotational shaft of the drive motor is coupled to a drive pulley, and the input shaft of the transmission gear mechanism is coupled to a transmission pulley, the drive pulley and the transmission pulley being drivingly coupled together such that the drive pulley drives the transmission pulley, and the transmission gear mechanism is downstream of the transmission pulley, wherein the rotational shaft of the motor armature and the output shaft of the transmission gear mechanism extend next to, and laterally offset from, one another, wherein at least the output shaft is disposed at the level of the tensioning arm axis of the tensioning arm and the output shaft is disposed coaxially with respect to the tensioning arm axis, wherein the rotational shaft of the motor armature and at least the output shaft of the transmission gear mechanism are disposed in a plane that is parallel to the plane spanned by the at least two drive rollers.

2. The drive system according to claim 1, wherein the output shaft of the transmission gear mechanism comprises a shaft extension that forms the tensioning arm axis.

3. The drive system according to claim 1, wherein the rotational shaft of the drive motor protrudes over a motor housing of the drive motor on the output side, and wherein the drive pulley and the transmission pulley are disposed next to one another in a plane and are drivingly coupled via a drive belt.

4. The drive system according to claim 1, wherein the lower pressing/advancing roller and/or the upper pressing/advancing roller are connected via a drive intermediate gear mechanism to the output shaft of the transmission gear mechanism or a shaft extension of the output shaft of the transmission gear mechanism.

5. An automatic welding machine for joining the edges of sealing sheets made of thermoplastic materials, characterized by the drive system according to claim 1.

6. The drive system according to claim 1, wherein the output shaft of the transmission gear mechanism extends through the tensioning arm.

7. The drive system according to claim 1, wherein the tensioning arm extends longitudinally in a forward-rearward direction between opposite first and second end portions, the first end portion being mounted pivotably about the tensioning arm axis on the frame of the automatic welding machine, and the second end portion being distal the tensioning arm axis and having a clevis-shaped roller support within which the upper pressing/advancing roller is rotatably mounted about the driven upper roller rotational axis.

8. The drive system according to claim 7,
wherein the tensioning arm includes an intermediate portion between the first and second end portions, the intermediate portion having opposite left and right sides that face outwardly away from each other in respective outward horizontal directions; and
wherein the clevis-shaped roller support includes laterally spaced apart left and right roller support portions that are each disposed further outwardly in the respective horizontal directions than the corresponding left and right sides of the intermediate portion of the tensioning arm.

9. The drive system according to claim 1, wherein the tensioning arm is a single tensioning arm that extends in a forward-rearward direction and is pivotably mounted on a single portion of the frame, and wherein the single tensioning arm is pivotable about the tensioning arm axis within a single vertical plane.

10. The drive system according to claim 1, wherein the frame has opposite left and right outer sides, and wherein the tensioning arm is pivotably mounted to the frame at a location between the left and right outer sides of the frame.

11. The drive system according to claim 10, wherein the tensioning arm extends in a forward-rearward direction between opposite first and second end portions, the tensioning arm having opposite left and right sides that each facing outwardly away from each other in respective left and right horizontal directions, and
wherein the transmission gear mechanism is arranged outside and laterally offset to one of the left or right sides of the tensioning arm such that the transmission gear mechanism is further outward in the left or right horizontal direction than the left or right side of the tensioning arm.

12. A drive system for driving an automatic welding machine designed to join the edges of sealing sheets, the automatic welding machine comprising at least two pressing/advancing rollers located vertically opposite one another, an electric drive motor for at least one of the pressing/advancing rollers and a transmission gear mechanism connected downstream of the drive motor, an upper pressing/advancing roller being disposed rotatably about a driven upper roller rotational axis on a tensioning arm of the automatic welding machine and a lower pressing/advancing roller being disposed rotatably about a lower roller rotational axis on a frame of the automatic welding machine, the tensioning arm being mounted pivotably about a tensioning arm axis on the frame of the automatic welding machine, and the frame being supported by at least two drive rollers, the drive motor and the transmission gear mechanism being rigidly attached to the frame, the transmission gear mechanism being arranged outside and laterally offset to the tensioning arm, the drive motor comprising a motor armature rotating about a protruding rotational shaft, and the transmission gear mechanism comprising a rotatable protruding input shaft and a rotatable protruding output shaft, and the tensioning arm axis, the roller rotational axis, the rotational shaft, the input shaft and the output shaft being disposed parallel to one another, wherein the rotational shaft of the drive motor is coupled to a drive pulley, and the input shaft of the transmission gear mechanism is coupled to a transmission pulley, the drive pulley and the transmission pulley being drivingly coupled together such that the drive pulley drives the transmission pulley, and the transmission gear mechanism is downstream of the transmission pulley, wherein the rotational shaft of the motor armature and the output shaft of the transmission gear mechanism extend next to, and laterally offset from, one another, wherein at least the output shaft is disposed at the level of the tensioning arm axis of the tensioning arm and the output shaft is disposed coaxially with respect to the tensioning arm axis, wherein the output shaft of the transmission gear mechanism includes a shaft extension that is an input shaft for driving a drive intermediate gear mechanism downstream of the transmission gear mechanism.

13. The drive system according to claim 12, wherein the drive pulley and the transmission pulley are on a first side of the frame of the automatic welding machine, and wherein the drive intermediate gear mechanism is on a second side of the frame that is opposite the first side.

14. A drive system for driving an automatic welding machine designed to join the edges of sealing sheets, the automatic welding machine comprising at least two pressing/advancing rollers located vertically opposite one another, an electric drive motor for at least one of the pressing/advancing rollers and a transmission gear mechanism connected downstream of the drive motor, an upper pressing/advancing roller being disposed rotatably about a driven upper roller rotational axis on a tensioning arm of the automatic welding machine and a lower pressing/advancing roller being disposed rotatably about a lower roller rotational axis on a frame of the automatic welding machine, the tensioning arm being mounted pivotably about a tensioning arm axis on the frame of the automatic welding machine, and the frame being supported by at least two drive rollers, the drive motor and the transmission gear mechanism being rigidly attached to the frame, the transmission gear mechanism being arranged outside and laterally offset to the tensioning arm, the drive motor comprising a motor armature rotating about a protruding rotational shaft, and the transmission gear mechanism comprising a rotatable protruding input shaft and a rotatable protruding output shaft, and the tensioning arm axis, the roller rotational axis, the rotational shaft, the input shaft and the output shaft being disposed parallel to one another, wherein the rotational shaft of the drive motor is coupled to a drive pulley, and the input shaft of the transmission gear mechanism is coupled to a transmission pulley, the drive pulley and the transmission pulley being drivingly coupled together such that the drive pulley drives the transmission pulley, and the transmission gear mechanism is downstream of the transmission pulley, wherein the rotational shaft of the motor armature and the output shaft of the transmission gear mechanism extend next to, and laterally offset from, one another, wherein at least the output shaft is disposed at the level of the tensioning arm axis of the tensioning arm and the output shaft is disposed coaxially with respect to the tensioning arm axis, wherein the output shaft of the transmission gear mechanism includes a shaft extension that is an input shaft for driving a drive intermediate gear mechanism, the drive intermediate gear mechanism being drivingly coupled between the transmission gear mechanism and the lower pressing/advancing roller, such that rotation of the output shaft drives the lower pressing/advancing roller via the drive intermediate gear mechanism.

15. The drive system according to claim 14, wherein the drive pulley and the transmission pulley are on a first side of the frame of the automatic welding machine, and wherein the drive intermediate gear mechanism is on a second side of the frame that is opposite the first side.

16. The drive system according to claim 14, wherein the output shaft of the transmission gear mechanism extends through the tensioning arm.

* * * * *